United States Patent [19]

Hagiya et al.

[11] Patent Number: 4,773,014
[45] Date of Patent: Sep. 20, 1988

[54] ANTI-SKID CONTROL SYSTEM FOR MOTOR VEHICLES

[75] Inventors: Naoyuki Hagiya, Ageo; Isao Yamaki, Iwatsuki; Hideo Akima, Yokohama; Akira Hoashi, Munakata, all of Japan

[73] Assignees: Akebono Brake Industry Co., Ltd., Tokyo; Fujitsu Limited, Kanagawa, both of Japan

[21] Appl. No.: 946,825

[22] Filed: Dec. 29, 1986

[30] Foreign Application Priority Data

Dec. 27, 1985 [JP] Japan .................. 60-293000

[51] Int. Cl.$^4$ ................................. B60T 8/58
[52] U.S. Cl. ..................... 364/426.02; 303/95
[58] Field of Search .............. 364/426, 565; 180/197; 303/94–96, 102, 103, 109, 113

[56] References Cited

U.S. PATENT DOCUMENTS

| | | | |
|---|---|---|---|
| 4,313,166 | 1/1982 | Rode et al. | 364/426 |
| 4,446,522 | 5/1984 | Sato et al. | 364/426 |
| 4,504,911 | 3/1985 | Braschel et al. | 364/426 |

*Primary Examiner*—Gary Chin

[57] ABSTRACT

An anti-skid control system for motor vehicles is disclosed wherein in case the wheel speed is equal to or lower than a minimum speed which is detectable by a microcomputer, the wheel speed is set at a predetermined threshold speed level between the minimum speed and zero, thereby preventing reduction of brake pressure from being started when the wheel is lower than the threshold speed. The anti-skid control system may also be designed such that a computed vehicle speed is set up which is approximate to the real vehicle speed; a reference speed is also set up on the basis of the computed vehicle speed in such a manner that it is lower by a predetermined amount than and follows the computed vehicle speed with such a speed difference; when the wheel speed becomes equal to or lower than a minimum speed which is detectable by a microcomputer, the wheel speed is set at a predetermined threshold speed level between the minimum speed and zero; and if a brake pressure reducing condition is prevailing at a point of time when the reference speed becomes equal to the threshold speed, then such a condition is released.

4 Claims, 5 Drawing Sheets

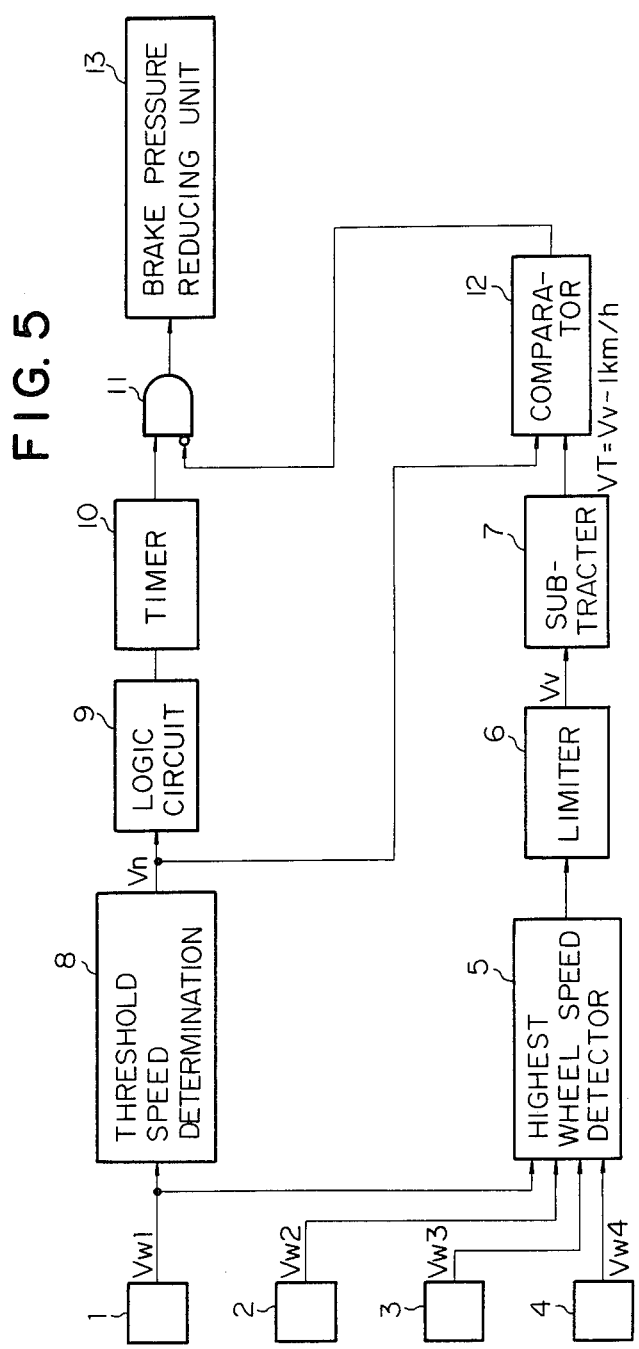

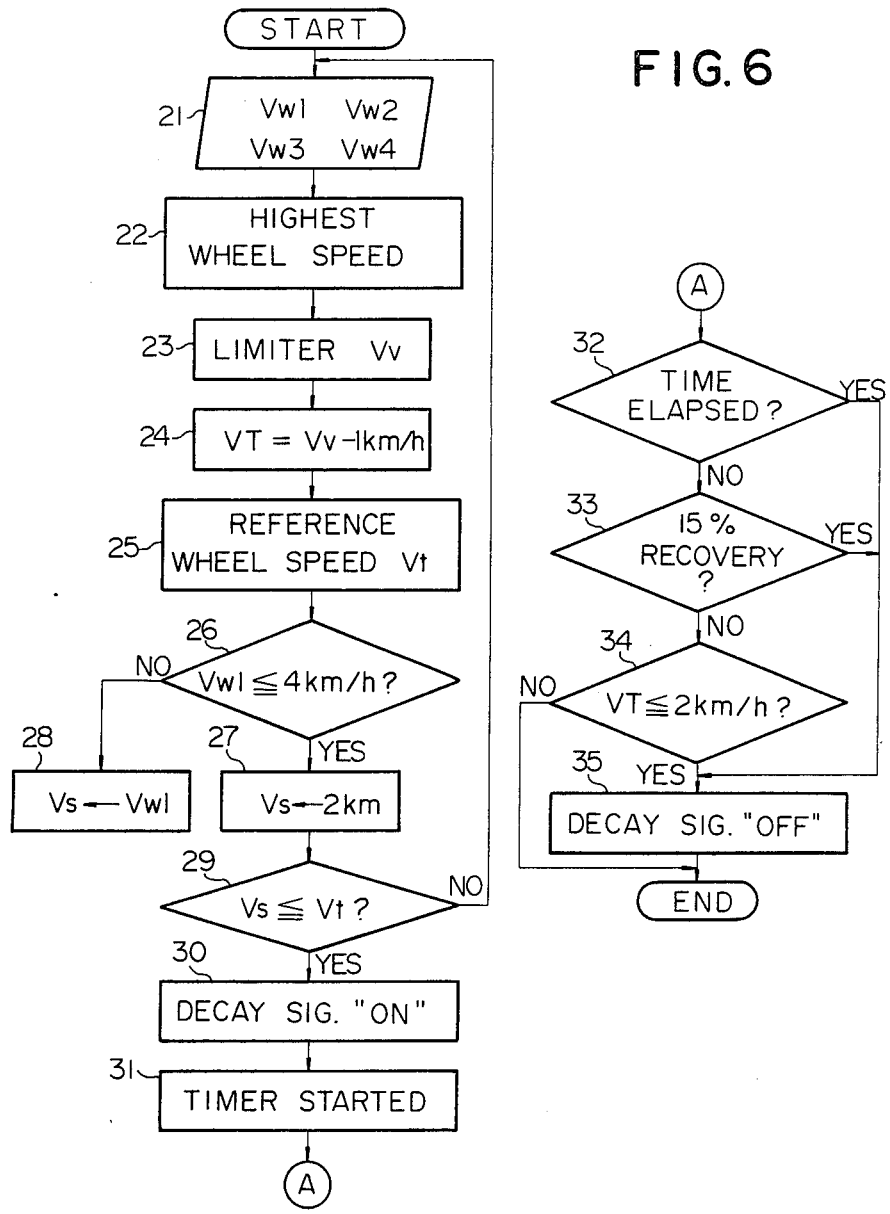

ANTI-SKID CONTROL SYSTEM FOR MOTOR VEHICLES

BACKGROUND OF THE INVENTION

1. Field of the Invention:

This invention relates to an anti-skid control system for motor vehicles, which is adapted to prevent the wheels of the motor vehicle from skidding during braking operation, and more particularly it pertains to such a system designed to prevent a brake pressure reduction mode from occurring or to immediately release such mode even if it occurred, when the motor vehicle is stopped, thereby preventing the vehicle from sliding down when stopped on a sloping road surface or the like.

2. Description of the Prior Art:

Generally, with an anti-skid control system for motor vehicles, braking control is effected with the aid of microcomputers such that hold valves and decay valves comprising electromagnetic valves are opened and closed on the basis of electrical signals representing wheel speeds sensed by wheel speed sensors, thereby increasing, holding or reducing the brake pressure, for the purpose of securing improved steering performance and running stability of the motor vehicle, while at the same time shortening the braking distance.

FIG. 1 of the accompanying drawings illustrates the relationships between wheel speed Vw, brake pressure Pw, and decay signal for opening decay valves so that the brake pressure is reduced, which occur during the operation of the above-mentioned conventional anti-skid control device.

When the brake pressure Pw is not increased while the motor vehicle is running, the hold valves remain opened while the decay valves remain closed, and under such a condition, if the brake pressure Pw is increased, then the wheel speed Vw is decreased. When the deceleration (negative acceleration) of the wheel reaches a predetermined level, the hold valves are opened so that the brake pressure is held, and subsequently the wheel speed Vw is abruptly decreased. At time when the wheel speed Vw becomes equal to a reference wheel speed Vt which is previously set up on the basis of the wheel speed Vw in such a manner that it follows the wheel speed Vw with a predetermined relationship thereto, i.e., at time t1 when the curve representing the wheel speed Vw and that representing the reference wheel speed Vt cross each other, the decay signal is generated so that reduction of the brake pressure Pw is started. As a result of this brake pressure reduction, the wheel speed is changed from deceleration to acceleration at time 2 when a low peak V1 of the wheel speed occurs; at time t3 when the wheel speed Vw recovers up to a speed Vb which is higher than the low peak V1 by 15% of the difference A between the wheel speed Va at the brake pressure reduction starting time t1 and the wheel speed V1 at the low-peak point t2 (Vb=V1+0.15 A), the brake pressure is held; and subsequently, at time t4 when a high peak Vh of the wheel speed Vw is reached, buildup of the brake pressure is started again. The buildup of the brake pressure Pw is effected in such a manner that the brake pressure is increased and held alternately and mincingly in succession so that the brake pressure Pw is caused to build up gradually. At time when the wheel speed Vw becomes equal to the reference wheel speed Vt, i.e., at time t5 when the curve representing the wheel speed Vw and that representing the reference wheel speed Vt cross each other, the next brake pressure reduction cycle is performed. Repetition of such control cycle results in the vehicle speed being decreased without wheel skidding.

The above anti-skid control is effected by means of a microcomputer on the basis of electrical signals derived from wheel speed sensors adapted to detect the respective wheel speeds, and there is a minimum speed Vmin detectable by the central processing unit (CPU) of the microcomputer. With the conventional anti-skid control procedures, when the wheel speed Vw goes below the minimum speed Vmin, say 4 km/h, it is regarded as zero as shown by a solid line. Such a wheel speed Vs detected by the CPU will be referred to as "system speed" hereinafter. The system speed Vs coincides with the wheel speed Vw except when the wheel speed is equal to or lower than the minimum speed Vmin. At time when the system speed Vs and reference wheel speed Vt become equal to each other, the decay signal is generated so that reduction of the brake pressure is started.

With the foregoing anti-skid control, when the vehicle runs on a road surface with a low friction coefficient u (low-u road surface), there is the tendency that the wheel speed is behind in recovery after the brake pressure is reduced; thus, a longer time is take before the wheel speed Vw reaches a high peak which is the next pressure buildup starting point, or in some cases no high peak of the wheel speed occurs at all, as a result of which a non-braking condition persists all this time. To avoid persistence of such a non-braking condition, it has been the practice that a timer is provided which is adapted, when no brake pressure reduction stopping point is reached after a lapse of a predetermined time period, for forcibly interrupting the hold signal HS to open the hold valves, thereby causing the brake pressure Pw to be increased abruptly.

Assume that at the time t1 when the system speed Vs is higher than the minimum speed Vmin, the decay signal is generated, by which reduction of the brake pressure is started. In such a case, since the wheel speed Vw is higher than the minimum speed Vmin at the time t1, the wheel speed Vw is prevented from dropping down to zero and permitted to recover through the low peak which occurs at the time t2, even if the wheel speed Vw is further decreased to go below the minimum speed Vmin; and at time t3 when the wheel speed Vw recovers up to the level of the minimum speed Vmin, the decay signal is interrupted. Thus, the brake pressure Pw is switched from reduction to holding at the time t3, and again increased at time t4 when high peak of the wheel speed Vw occurs.

At time t5 when the wheel speed Vw is decreased down to the level of the minimum speed Vmin, the system speed Vs becomes zero; thus, at the time t5, the curve representing the system speed Vs and that representing the reference wheel speed Vt cross each other so that the decay signal is generated. However, since the wheel speed Vw is decreased down to the level of the minimum speed Vmin, even if reduction of the brake pressure Pw is started, the wheel speed Vw is no longer permitted to recover so that the vehicle is stopped. For this reason, the decay signal is prevented from being interrupted based on recovery of the wheel speed, and thus it is caused to persist until it is forcibly interrupted by a timer which is started at the time t5 when the decay signal is generated; as a result, there occurs a non-braking condition which persists all this while. Assuming that the time set on the timer is 1.44 seconds, the non-braking condition persists for about 2 seconds including the period, say 0.6 seconds during which the brake pressure is held after the decay signal is interrupted. As a consequence, the braking distance will be increased, and thus there is the tendency that when stopped on a sloping road or the like, the motor vehicle tends to slide down.

SUMMARY OF THE INVENTION

Accordingly, it is an object of the present invention to provide an anti-skid control system for motor vehicles, which is designed so that when the vehicle speed is dropped down to a level close to zero, generation of a decay signal is prohibited so that no reduction of brake pressure is started, thereby preventing occurrence of a non-braking condition.

Another object of the present invention is to provide an anti-skid control system for motor vehicles, which is designed so that when the vehicle speed is dropped down to a level close to zero, even if a decay signal is generated so that reduction of brake pressure is started, the decay signal is immediately interrupted, thereby preventing persistence of a non-braking condition.

According to one aspect of the present invention, there is provided an anti-skid control system for motor vehicles, wherein in case the wheel speed is equal to or lower than a minimum speed which is detectable by a microcomputer, e.g. 4 km/h, the wheel speed is set at a predetermined threshold speed level between the minimum speed and zero, e.g. 2 km/h, thereby preventing reduction of brake pressure from being started when the wheel speed is lower than the threshold speed.

According to another aspect of the present invention, there is provided an anti-skid control system for motor vehicles, wherein a computed vehicle speed is set up which is approximate to the real vehicle speed; a reference speed is also set up on the basis of the computed vehicle speed in such a manner that it is lower by a predetermined amount than and follows the computed vehicle speed with such a speed difference; when the wheel speed becomes equal to or lower than a minimum speed which is detectable by a microcomputer, the wheel speed is set at a predetermined threshold speed level between the minimum speed and zero; and if a brake pressure reducing condition is prevailing at a point of time when the reference speed becomes equal to the threshold speed, then the brake pressure reducing condition is released.

Other objects, features and advantages of the present invention will become apparent from the ensuing description taken in conjunction with the accompanying drawings.

BRIEF DESCRIPTION OF THE DRAWINGS

FIG. 5 is a block diagram showing the control circuit arrangement for controlling a brake pressure reducing unit in accordance with the present invention.

FIG. 6 is a flow chart useful for explaining the operation of the control circuit shown in FIG. 5.

DESCRIPTION OF THE PREFERRED EMBODIMENTS

The present invention will now be described in greater detail with respect to specific embodiments thereof with reference to the drawings.

Figure 2:
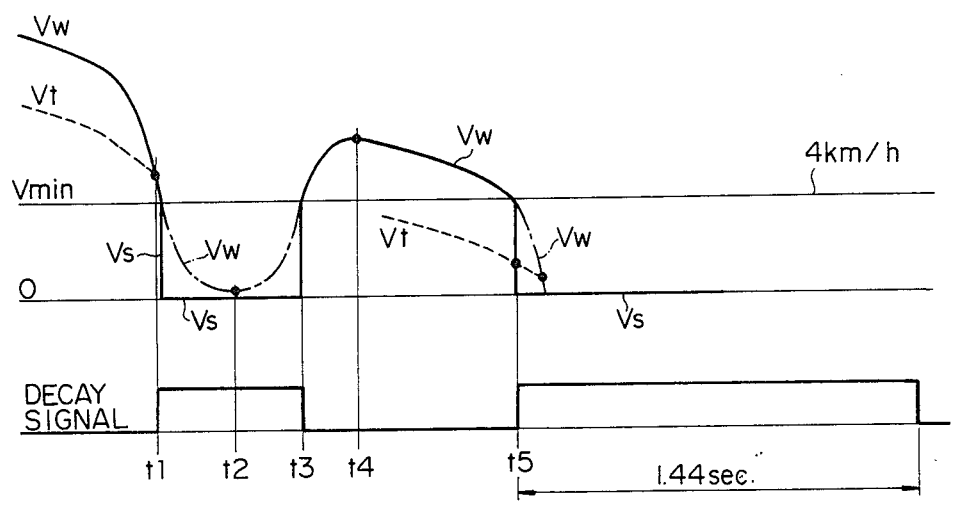
Figure 3:
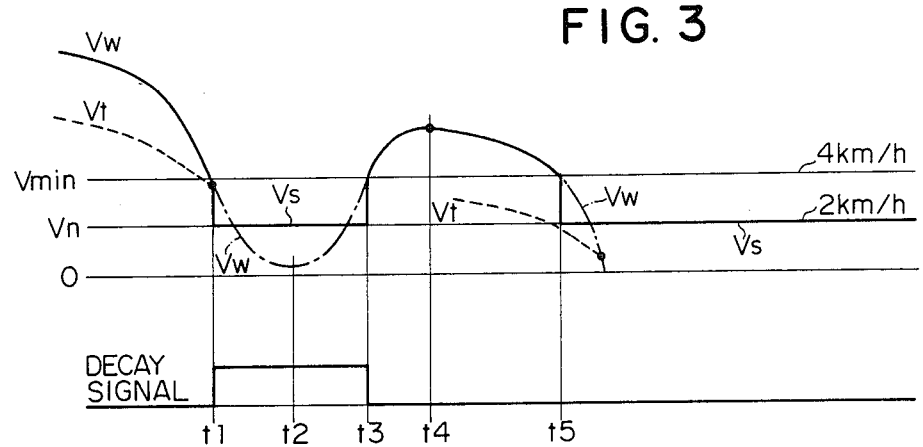
FIGS. 3 and 4 are views useful for explaining the operation of the anti-skid control system according to the present invention.

FIG. 3 illustrates, by way of example, the relationships between wheel speed Vw and system speed Vs, and decay signal which occur in a first embodiment of the present invention, in such a manner as to correspond to FIG. 2.

Figure 1:
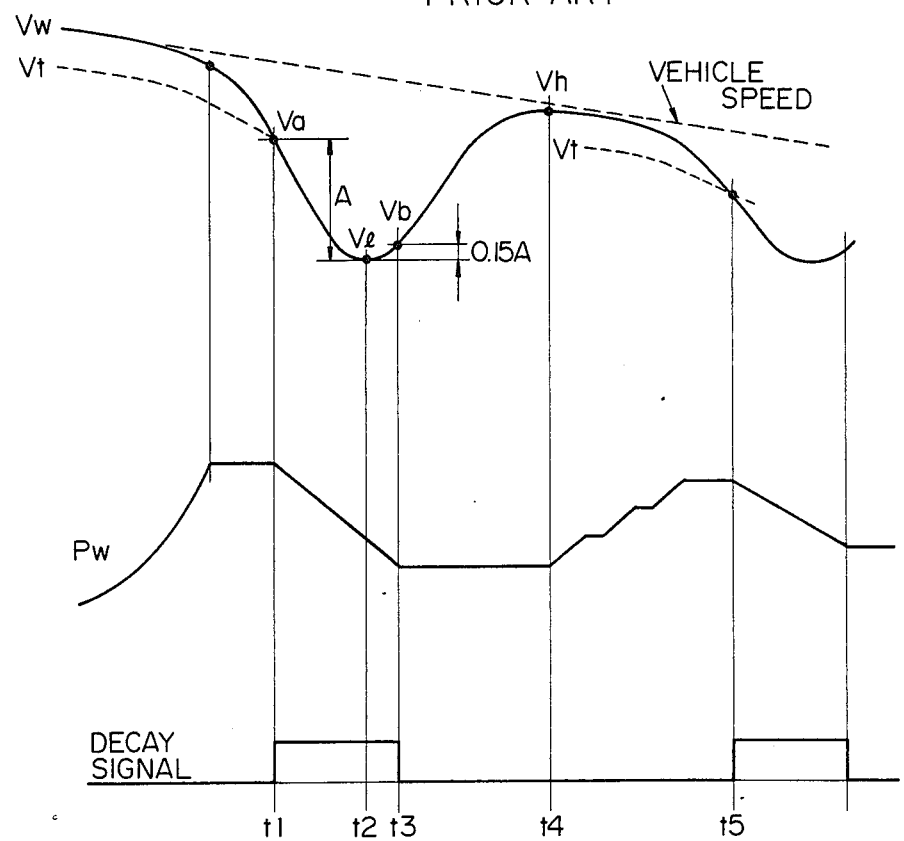
FIGS. 1 and 2 are views useful for explaining the operation of the prior-art anti-skid control system.

According to this embodiment of the present invention, a threshold speed Vn is previously set at a level, say 2 km/h which is higher than zero and lower than the minimum speed Vmin, say 4 km/h that is detectable by the CPU of microcomputer; and in case the wheel speed Vw goes below the minimum speed Vmin, then the system speed Vs which is the wheel speed detected by the CPU, is made to assume the above-mentioned threshold speed level Vn. Thus, with anti-skid control performed through braking operation, the wheel speed Vw is decreased; and at time t1 when the wheel speed Vw reaches the level of 4 km/h, the system speed Vs is dropped down to the level of the threshold speed Vn, i.e., 2 km/h; while the system speed Vs is being dropped, the curve representing the system speed Vs and that representing the reference wheel speed Vt which has been explained above in connection with FIGS. 1 and 2, cross each other; and as a result, a decay signal is generated, so that decay valves are opened, and thus reduction of the brake pressure is started. As a result of this brake pressure reduction, the wheel speed Vw is changed from deceleration to acceleration at time t2 when low peak of the wheel speed Vw occurs; at time t3 when the wheel speed Vw recovers up to 4 km/h, the system speed Vs is raised from 2 km/h to 4 km/h. At the time t3, the decay signal is interrupted, so that the decay valves are closed, and thus the brake pressure is held. At time t4 when the high peak of the wheel speed Vw is reached, buildup of the brake pressure is started so that the wheel speed Vw is decreased again; and at time t5 when the wheel speed Vw is decreased down to 4 km/h, the system speed Vs is dropped down to 2 km/h. As will be seen from FIG. 3, the reference wheel speed Vt is lower than 2 km/h at the time t5, and thus the curve representing the system speed Vs and that representing the reference wheel speed do not cross each other; therefore, no decay signal is generated, and thus no reduction of the brake pressure is started.

Figure 4:
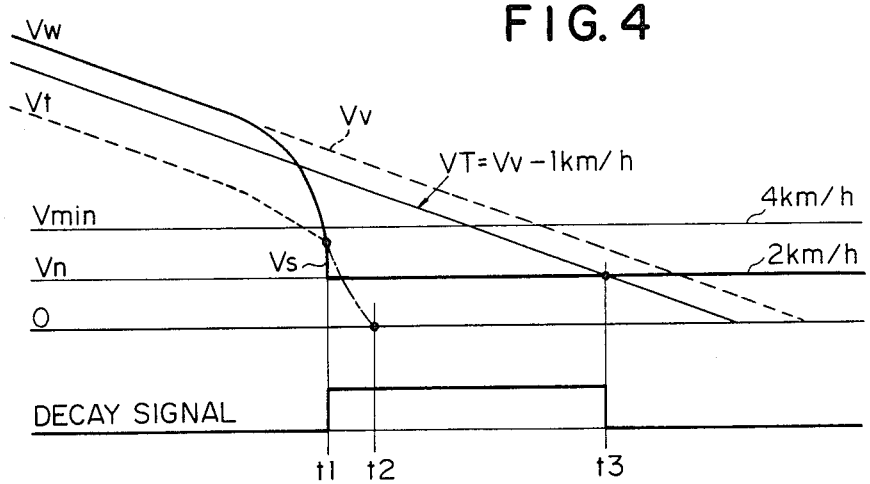

Referring to FIG. 4, there is illustrated, by way of example, the relationship between wheel speed Vw, system speed Vs, and decay signal, which occurs in a second embodiment of the present invention.

In the case of FIG. 4, too, the design is made such that when the wheel speed Vw is dropped down to the level of the minimum speed (4 km/h) detectable by CPU, the system speed Vs is dropped down to the threshold level of 2 km/h. In this case, a computed vehicle speed which is approximate to the real vehicle speed, is set on the basis of the highest one of the wheel speeds of the motor vehicle; and a reference speed VT is set on the basis of the computed vehicle speed Vv in such a manner that it is lower by a predetermined amount, say 1 km/h than and follows the computed vehicle speed Vv with such a speed difference, as follows:

$$VT = Vv - 1 \ km/h$$

At time t1 when the curve representing the system speed Vs and that representing the reference wheel speed Vt cross each other, the decay signal is generated, and reduction of the brake pressure is started. In this case, since the wheel speed Vw is close to zero, it is unable to recover despite the reduction of the brake pressure, and the wheel is stopped at time t2. Control circuit which will be described hereinafter, is arranged such that the reference speed VT is dropped along with the computed vehicle speed Vv; and at time t3 when the reference speed VT is dropped down to the threshold level, i.e., 2 km/h, the decay signal is interrupted. Thus, the brake pressure reducing condition is released at the time t3, and buildup of the brake pressure is started again.

An example of control circuit which is usable with the anti-skid control system of the present invention will be described with reference to FIG. 5. In FIG. 5, the highest one of wheel speeds Vw1 to Vw4 detected by four wheel speed sensors 1 to 4 respectively is inputted to a highest wheel speed detector 5 so that the highest one of the wheel speeds Vw1 to Vw4 is detected. The highest wheel speed is passed through a limiter 6 which is arranged to limit variations in the highest wheel speed to be in the range from +1 G to -1 G, so that the computed vehicle speed Vv is set up. Subsequently, the reference speed $VT \ (= Vv - 1 \ km/h)$ is calculated in a subtracter 7.

The wheel speed Vw1, which is now to be controlled, is inputted to a threshold speed determination circuit 8 which is designed so that when the wheel speed Vw1 goes below 4 km/h, the system speed Vs is dropped down to the predetermined threshold level Vn of 2 km/h. In a logic circuit 9, it is judged, on the basis of the system speed Vs and reference wheel speed Vt, whether or not reduction of the brake pressure should be started, and an output signal is provided; thereupon, a timer is started, the output of which is passed to an AND circuit 11. The threshold speed Vn (=2 km/h) set up in the threshold speed determination circuit 8, and the reference speed VT calculated in the subtracter 7 are compared in a comparator circuit 12; when the reference speed VT is higher than the threshold speed Vn, the comparator circuit 12 provides no output, and thus the AND circuit 11 provides decay signal to a brake pressure reducing unit 13, whereby reduction of the brake pressure is started. Thereafter, brake pressure reduction stopping output is derived from the logic circuit 9, and thereupon the decay signal is interrupted so that the reduction of the brake pressure is stopped. When no brake pressure reduction stopping output is derived from the logic circuit 9, the decay signal is interrupted under the action of the timer 10, so that the reduction of the brake pressure is stopped.

When the reference VT goes below the threshold level Vn as the computed vehicle speed is decreased, the comparator circuit 12 provides output so that the AND circuit 11 provides no output despite the judgment by the logic circuit 9 that reduction of the brake pressure should be started; thus, no decay signal is generated so that no reduction of the brake pressure is started. Even when the decay signal is being generated, the comparator 12 provides output when the reference speed VT becomes equal to the threshold speed Vn; thus the decay signal is interrupted. With the aforementioned control circuit arrangement, in case the wheel speed Vw1 to be controlled is lower than the threshold speed Vn, no reduction of the brake pressure is started, and even during the reduction of the brake pressure, when the reference speed VT becomes equal to the threshold speed Vn, the brake pressure reduction is stopped.

The control by the control circuit of FIG. 4 is performed in accordance with the flow chart of FIG. 6.

First, at step 21, the respective wheel speeds Vw1 to Vw4 are read in. At step 22, the highest one of the wheel speeds Vw1 to Vw4 is detected; and at step 23, the computed vehicle speed Vv is set up by passing the highest wheel speed through the limiter which is arranged to limit variations in the highest wheel speed to be in the range from +1 G to -1 G. At step 24, the reference speed $VT (= Vv - 1 \ km/h)$ is calculated; and at step 25, the reference wheel speed Vt is set up. At step 26, judgment is made as to whether the wheel speed Vw1 is equal to or lower than the minimum speed (4 km/h) which is detectable by the CPU, and if the result of the judgment is "YES", then the system speed VS is set at the threshold level of 2 km/h, while if the result of the judgment is "NO", then the system speed Vs is set to be equal to the wheel speed Vw1. At step 29, judgment is made as to whether or not the system speed Vs reached the level of the reference wheel speed Vt, and if the result of the judgment is "YES", then decay signal is generated at step 30, and the timer is started at step 31. If the result of the judgment at the step 29 is "NO", then the process is returned to the step 21.

At step 32, judgment is made as to whether or not the time set on the timer elapsed; and at step 33, judgment is made as to whether or not the system speed Vs recovered from the speed Vl occurring at a low-peak point of the wheel speed Vs, by 15% of the aforementioned speed difference A. If the result of each judgment is "NO", then at step 34, judgment is made as to whether or not the reference speed VT is equal to or lower than the threshold speed, i.e., 2 km/h; and if the result of the judgment at the step 34 is "NO", then the decay signal is not interrupted, while if the result is "YES", then the decay signal is interrupted. If the result of any of the judgments at the steps 32 and 33 is "YES", then the process is advanced to step 35, and the decay signal is interrupted. The above control flow is performed with a predetermined time interval (4 ms, for example).

As will be appreciated from the above discussion, according to the present invention, when the wheel speed becomes close to zero, reduction of the brake pressure is prohibited, and even during reduction of the brake pressure, the reduction is interrupted when the wheel speed becomes close to zero. In this way, according to the present invention, the braking distance can be shortened, while at the same time the vehicle can be prevented from sliding down when stopped on a sloping road or the like.

While the present invention has been described and illustrated with respect to some specific embodiments thereof, it is to be understood that the present invention is by no means limited thereto but encompasses all changes and modifications which will become possible within the scope of the appended claims.

I claim:

1. An anti-skid control system for a motor vehicle, comprising:
   means for providing a reference wheel speed which has a predetermined relationship to an actual wheel speed of the vehicle being decelerated;

means for providing a system speed which coincides with the actual wheel speed except when the actual wheel speed becomes equal to or lower than a minimum speed detectable by a microcomputer;

means for reducing brake pressure when said reference wheel speed and said system speed become equal to each other, to thereby cause the actual wheel speed to be changed from deceleration to acceleration; and means for changing said system speed to a predetermined threshold speed between said minimum speed and zero when said actual wheel speed becomes equal to or lower than said minimum speed, to thereby end reducing the brake pressure when the actual wheel speed is lower than said threshold speed.

2. The system according to claim 1, wherein said minimum speed is 4 km/h, and said threshold speed is 2 km/h.

3. The anti-skid control system for a motor vehicle, comprising:

means for providing a reference wheel speed which has a predetermined relationship to an actual wheel speed of the vehicle being decelerated;

means for providing a system speed which coincides with the actual wheel speed except when the actual wheel speed becomes equal to or lower than a minimum speed detectable by a microcomputer;

means for reducing brake pressure when said reference wheel speed and said system speed become equal to each other, to thereby cause the actual wheel speed to be changed from deceleration to acceleration;

means for providing a computed vehicle speed based on the actual wheel speed;

means for providing a reference speed on the basis of the computed vehicle speed in such a manner that said reference speed is lower, by a predetermined constant amount, than said computed vehicle speed;

means for changing, said system speed to a predetermined threshold speed between said minimum speed and zero when said actual wheel speed becomes equal to or lower than said minimum speed; and means for comparing said reference speed and said threshold speed and for ending reducing the brake pressure when said reference speed has dropped to said threshold speed.

4. The system according to claim 3, wherein said minimum speed is 4 km/h; said threshold speed is 2 km/h; and said reference speed is lower than said computed vehicle speed by 1km/h.

* * * * *